United States Patent
Wence et al.

(10) Patent No.: US 7,522,999 B2
(45) Date of Patent: Apr. 21, 2009

(54) INERTIAL WAYPOINT FINDER

(76) Inventors: Don Wence, 102 Barons Glenn Way, Cary, NC (US) 27513; Kathleen Scott, P.O. Box 71, Kamuela, HI (US) 96743

(*) Notice: Subject to any disclaimer, the term of this patent is extended or adjusted under 35 U.S.C. 154(b) by 471 days.

(21) Appl. No.: 11/333,832

(22) Filed: Jan. 17, 2006

(65) Prior Publication Data
US 2007/0168126 A1    Jul. 19, 2007

(51) Int. Cl.
*G01C 21/12* (2006.01)
*G01C 21/16* (2006.01)

(52) U.S. Cl. .................. 701/217; 701/220; 701/206

(58) Field of Classification Search ............... None
See application file for complete search history.

(56) References Cited

U.S. PATENT DOCUMENTS

| | | | |
|---|---|---|---|
| 4,991,126 A * | 2/1991 | Reiter | 702/152 |
| 5,612,688 A | 3/1997 | Masudaya | |
| 5,786,758 A | 7/1998 | Bullock | |
| 6,070,124 A * | 5/2000 | Nimura et al. | 701/211 |
| 6,243,660 B1 * | 6/2001 | Hsu et al. | 702/160 |
| 6,363,324 B1 | 3/2002 | Hildebrant | |
| 6,791,477 B2 | 9/2004 | Sari et al. | |
| 6,813,582 B2 * | 11/2004 | Levi et al. | 702/141 |
| 7,103,471 B2 * | 9/2006 | Levi et al. | 701/200 |
| 7,233,863 B2 * | 6/2007 | Rodriguez | 701/213 |

FOREIGN PATENT DOCUMENTS

| WO | WO 2005/057132 A1 | 6/2005 |
|---|---|---|
| WO | WO 2005/071431 A1 | 8/2005 |

* cited by examiner

*Primary Examiner*—Michael J. Zanelli

(57) ABSTRACT

Using a combination of inertial sensors (accelerometers 70, 80, 90, 170, 180, 190) and, perhaps, a digital compass, a device can record movement in all directions relative to an origin (300), or initial position. Once the device has captured the information, it can calculate heading and distance from the current position back to the origin (160). Other navigational equipment relies on signals from global positioning system (GPS) satellites and, thus, will not function properly in urban canyons or inside buildings of any sort. This device can determine direction and distance under nearly any circumstances and has a small footprint that will allow the embedding of it into nearly any consumer electronic device (10). The consumer electronic device can then display a directional arrow (30), or the distance to the origin (40) alongside other relevant information. One obvious use of the invention is to find your parked vehicle (60) (also known as a "vehicle locator").

10 Claims, 6 Drawing Sheets

INERTIAL WAYPOINT FINDER

FEDERALLY-SPONSORED RESEARCH

Not Applicable

SEQUENCE LISTING OR PROGRAM

Not Applicable

BACKGROUND-FIELD OF INVENTION

This invention relates to inertial and geomagnetic navigation toward an identified waypoint by calculating current position relative to the waypoint.

BACKGROUND-DESCRIPTION OF PRIOR ART

For centuries, mankind has used various devices to assist him in traveling from one place to another. He has used the sextant, printed maps, the magnetic compass, and, more recently, global positioning system (GPS) receivers to guide him.

For the purposes of the present invention, the following terms should be considered to have the associated meanings:

waypoint
  a single place of particular interest to a navigator
origin
  a waypoint whose location defines the starting point for a journey (or a segment of a journey)
destination
  a waypoint whose location defines an ending point for a journey (or a segment of a journey)
location
  a pseudo-waypoint that defines the current position At present, navigators primarily use one of five methods. The first method involves
  (a) knowing your approximate location (either by innate knowledge of your surroundings) or by some form of dead-reckoning (triangulation of your location based on knowledge of other distant, but perceptible, objects),
  (b) finding your location on a mental or physical map,
  (c) determining a compass heading toward the destination, and
  (d) following the compass heading until arriving at the destination.

This method works well for travel from a location to a destination, but suffers from one distinct problem: if there exist no objects against which to dead-reckon, this method of navigation will not work. This case presents itself in many non-structured travel situations (for example, when hiking through a forest, off-road driving, walking through a grassy field, or operating a boat on the open ocean).

The Second Method in Common Use Today Involves
  (a) knowing the latitude and longitude of the destination,
  (b) using a GPS receiver to determine the current latitude and longitude on the earth (dead-reckoning against some number of geosynchronous satellites provides you with a location), and
  (c) calculating a heading based upon the location and the destination.

This second method works well on the open ocean or in a grassy field where a clear path to earth orbit exists (the domain of the satellites), but breaks down when traveling through a forest, a tunnel, or in any other overhead-obstructed situation (such as when indoors, navigating through an urban canyon with tall buildings all around, or in a parking garage).

A Third Method Involves
  (a) transmitting a homing signal from a device at your location,
  (b) receiving the homing signal at the destination,
  (c) calculating a heading based on the direction of the homing signal, and
  (d) transmitting the heading to the device for display to the user.

This third method overcomes some of the shortcomings of the other two methods, but is not optimal because it requires the use of transmission and receiving equipment at both the destination and your location. This third method can also be reversed. It can transmit the homing signal from the destination and receive at the location, but it does not eliminate the shortcomings.

The fourth method involves
  (a) knowing the latitude and longitude of the destination,
  (b) using a GPS receiver to continuously track your location (expressed as latitude and longitude),
  (c) using an inertial navigation system (INS) to compute the location when the GPS receiver loses contact with the GPS satellites, and
  (d) calculating a heading based upon the location (from either the GPS receiver or the INS) and the destination.

This fourth method provides better coverage than method two (works in situations where no GPS signal is available), but still has disadvantages. Traditionally, inertial navigation systems have lost accuracy quickly because of difficulties accounting for angular acceleration. To combat problems with angular acceleration, these systems were most often gimbaled to a vehicle and were not portable. Additionally, if a device using this method cannot obtain any GPS signals at all, it fails to work (for example, this would be the case when the unit is powered on while inside a parking garage and all the navigation is inside the garage). It must have an initial GPS reading (or a manually entered latitude and longitude) in order to begin the navigation.

The fifth method involves
  (a) transmitting light or sound from the destination,
  (b) receiving the light or sound at your location, and
  (c) determining a heading based on the direction from which the light or sound emanates.

This is a commonly used method for navigating a ship near a shoreline (for example, a lighthouse using its beacon and a fog horn to assist ships on a foggy night). This method is also frequently used by people looking for their automobiles in a parking lot (for example, using the alarm system's key fob, setting off the alarm and then looking for or listening for their alarm system). While this method has been effectively used for many years, it requires close proximity to the source of the light or sound and is not useful when further away. Further, it is only usable when the waypoint to be identified presently has controllable light or sound transmission equipment.

A number of inventions use one or more of the methods outlined above for the purpose of starting at an origin (for example, your automobile in a parking lot), navigating away from it (perhaps to attend your child's soccer game) and then may use the invention to assist in navigating from a location back to the origin (finding your car amongst all the other cars). For example:

(i) in U.S. Pat. No. 6,791,477, Sari, et al, describe a system where GPS receivers are located in both an automobile and in mobile units used to calculate distance and heading to the automobile. This method works fine in a grassy field, but fails when the auto enters a parking garage or when a mobile unit enters an area with a canopy of trees, a so-called "urban canyon," or a store or shopping mall. In any of these, or like cases, the invention simply fails to provide any useful information. Further, this invention requires the existence of a base station at the origin (inside the auto).

(ii) in U.S. Pat. No. 6,363,324, Hildebrant describes a vehicle locator system that relies on GPS receivers both at the origin and at the location and uses a radio frequency (RF) communications protocol to talk between the two devices. Like other GPS-enabled inventions, the GPS receiver at the origin (in the auto) will not work in a parking garage and the GPS receiver in the handheld device at the location will not work if indoors or in any covered area.

(iii) in WIPO Pat. App. No. 5057132A1, Bye describes a combined GPS and inertial navigation system (INS) for navigating aircraft under adverse conditions that claims a number of redundant RF ranging options that allow the system to automatically correct for errors that may occur in the GPS-based navigation system. The invention requires initial GPS readings, but may navigate after the GPS fails by translating the inertial changes to the reference frame used by GPS-based systems.

(iv) in WIPO Pat. App. No. 5071431A1, Ford, et al, describe an integrated GPS and INS system with a data filter for reducing propagated errors in the deeply-coupled system. The invention requires initial GPS readings and will supplement or correct using additional information from the INS and related systems.

(v) in U.S. Pat. No. 5,786,758, Bullock describes a vehicle location system where a remote control device (a key fob) activates a telescoping antenna with a flashing light mounted at the top and activates a sound-making device to assist the user by providing visual and audio cues as to the location of an automobile. This approach works acceptably in a parking garage or small parking lot, at the risk of irritating other humans in the parking lot. Unfortunately, it does not assist the user to find his or her car if they are still inside a building or are not within visual or audible range of the car.

(vi) in U.S. Pat. No. 5,612,688, Masudaya describes a device that will keep track of movements in various directions after the device is removed from its cradle. Further, Masudaya claims an invention that requires a battery charging base station at the origin, tying its use to a single, specific origin. The origin is always the location of the base station.

All the above inventions, and many others that apply similar technologies, suffer from at least one of two distinct disadvantages. They either:

(i) require a GPS signal (nearly impossible to acquire in a parking garage, inside a building, or when surrounded by tall buildings), or (ii) require a base station somewhere in the field of activity (whether located in a car or in a parking lot) either to communicate with the device or to provide a service to the device (such as charging or activating the device).

Objects and Advantages

People the world over, more and more reliant upon technologies such as automobiles and cellular phones, have far too much to remember. There have been many inventions in recent years designed to assist such ones with the volumes of information they need to run their lives: some cellular phones have address books, notepads, and other memory saving devices; some phones have access to the Internet, web sites, email, and other services; some automobiles can be remotely managed and even problems can be diagnosed remotely.

With all these advancements, we still lose our cars. In many cities around the world, when you park your car in a parking garage or on the street, you have little assurance that it will be readily found when you return 6, 8, or 10 hours later.

Whether shopping in an open-air market, a shopping mall, or on the busy streets of a large city, when your group splits up with the intent to meet back for dinner, everyone has to keep in mind where they are going and which direction it is back to the meeting place.

This information is simply one more thing to remember. Yes, it is simple for some people to draw a mental or physical map of the area and then remember exactly where your car is, or where to meet, but for a vast majority of us, it's not that simple. We don't want to remember where our car is. We want someone (or something) to show us where our car is. All of us have far more important things to remember than where we parked the car.

It is true that we can set off the panic alarm on our car and locate it visually or audibly, but, at the same time that it shows where our car is, it is also alerting criminals to that fact that we are lost. Further, it is obnoxious to others in the parking lot and draws negative attention to ourselves. This is not the way to find your car.

Instead, we would want a device that can show us where our car is that is discreet and that works under all circumstances. Working only when we are outside isn't good enough.

Primary Challenge

Thus, the primary challenge is to get you back to anywhere you choose, no matter where you go.

The present invention proposes the following: find your way back to any location (your car, your meeting place, a street corner, et cetera) after traveling anywhere you may need to go (in and out of stores, in-between high-rise buildings) all by pressing a button when you start and by following an arrow pointing you in the right direction.

This invention, embedded in your cellular phone, your personal music player, your personal digital assistant (PDA), or any other portable electronic device, will assist you in getting back. You could even use it in place of a GPS device to find your way back to your hotel after going out to eat.

No wires, no chargers, no tethers, no restrictions. Everything you need is in the palm of your hand. It's simple: under all circumstances, find your way back.

SUMMARY

In accordance with the present invention, the inertial waypoint finder comprises a device for sensing positive or negative acceleration, a device for computing the direction of the acceleration, a method for computing the distance and composite direction of travel to an origin, and a device for conveying to an operator the direction in which the origin lies.

DRAWINGS

Drawing Figures

Figure 1:
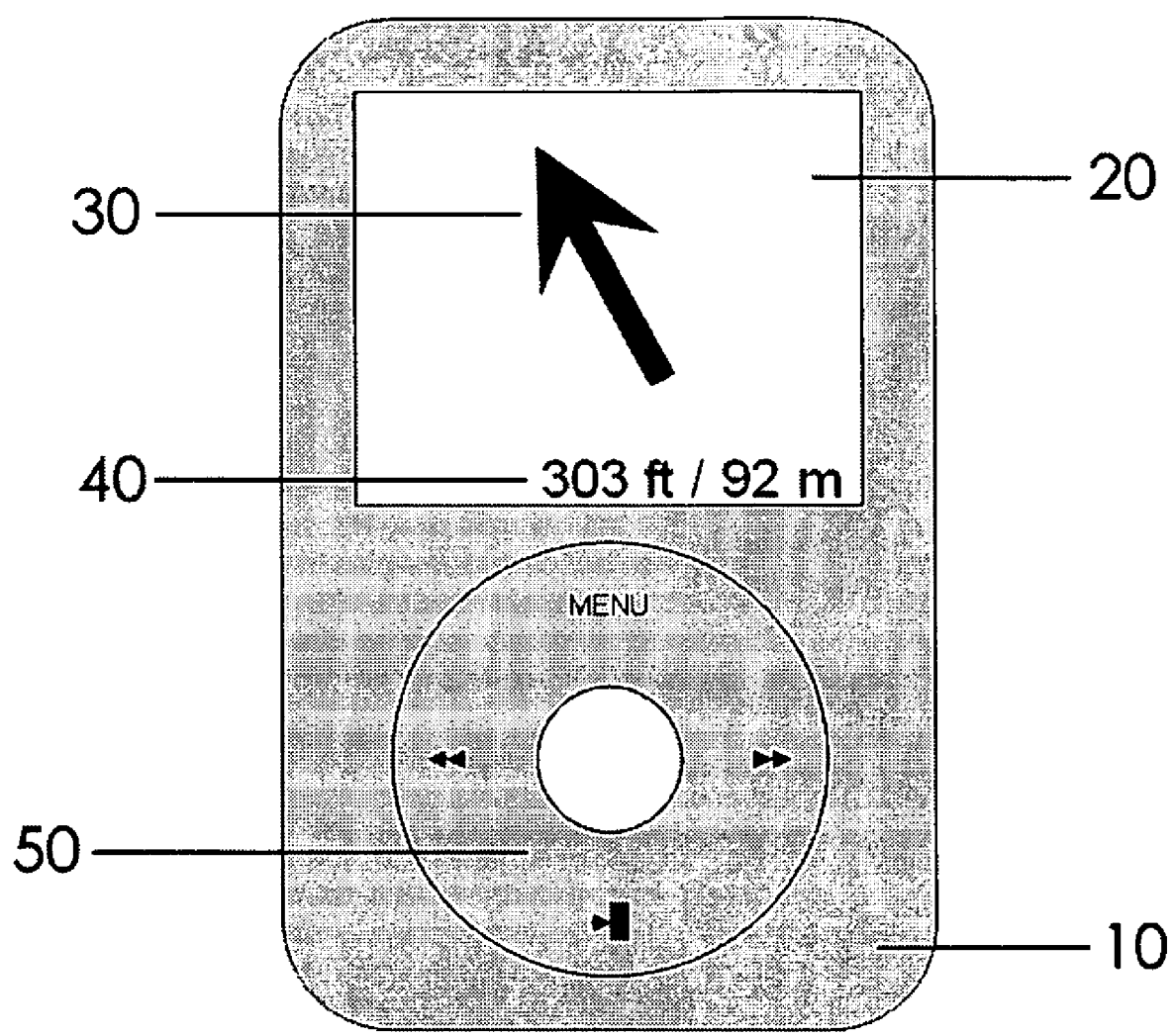
FIG. 1 shows various external control and display mechanisms

REFERENCE NUMERALS IN DRAWINGS 10 portable consumer electronic device
20 liquid crystal display (LCD)
30 arrow showing direction of travel to the origin
40 computed distance to origin
50 input buttons
60 car parked at a parking meter
70 linear accelerometer
80 linear accelerometer
90 linear accelerometer
100 yaw-rate sensor
110 processor
120 tilt-rate sensor
130 composite direction of travel
140 transmitter
150 receiver
160 direction of travel to origin
170 angular accelerometer
180 angular accelerometer
190 angular accelerometer
210 axis X
220 axis Y
230 axis Z
240 Earth
300 origin
310 first movement
320 second movement

DETAILED DESCRIPTION

Description and Operation

FIG. 1—CONSUMER ELECTRONIC DEVICE PREFERRED EMBODIMENT

Henceforth in this description, we will use the term "navigation system" to refer specifically to the present invention and the term "device" to refer more generally to the housing into which the navigation system may be embedded and whose facilities may be used to interface with the navigation system.

A preferred embodiment of the inertial waypoint finder is to embed the navigation system inside another consumer electronic device. FIG. 1 shows the exterior view of such an embodiment. Shown is a device 10, a personal music player, complete with an LCD display 20 and buttons 50 for controlling various functions of the player as well as functions of the present invention. On the display 20 of the device 10 are a directional arrow 30 showing the direction of travel to the origin and the computed distance from the current position to the origin 40 displayed in feet and meters.

To operate the navigation system, use the input buttons 50 of the device to select the waypoint finder application. Press any input button 50 to identify your origin, the place to which you want to return. Walk away and go shopping or perform some other task. When the task is complete, hold the device 10 in the palm of your hand with the display 20 facing upward and view the directional arrow 30 and distance 40. From your current position, you should travel the number of meters indicated by the distance 40 in the direction indicated by the directional arrow 30. The arrow 30 will point directly at the origin. If you turn the device 10 and face a different direction, the arrow 30 will turn to show the new direction relative to the device 10, but will still point at the origin.

In the preferred embodiment, the invention uses the services provided by a "host" device, but it could be a separate, stand-alone device with its own display mechanism. The display 20 could be an LCD screen or any other mechanism for conveying a direction. For example, the mechanism could have a series of LEDs where each LED indicates a known direction, "speak" the directions to the user, display an image or text with "digital ink", provide haptic (or, "force") feedback to the user "pulling" him in the right direction, display textual directions, or transmit the relevant information to another device.

Instead of identifying an origin by selecting an application and pressing a button, the device 10 could be in the form of a car alarm system key fob and the origin could be identified at the same time as the car alarm is set. The origin could be identified by bouncing or shaking the device or providing a voice command such as "set waypoint" or "set origin". The origin could also be automatically identified when the device senses the loss of an RFID signal from an RFID tag or other proximity sensor.

Another embodiment of the device could be in the form of a rubber, bouncing ball where the navigation system is contained in the nucleus. The origin could be identified by bouncing the ball and it could use "digital ink" to display the direction of travel to the origin across the surface of the ball.

One embodiment could be in the form of a small robot that accepts voice commands to identify the origin and heads back to the origin when placed on the ground or an unmanned aerial vehicle (UAV) that returns to and hovers over the origin when released.

An embodiment could further be a navigation system embedded with an automobile guidance system that could assist the automobile in returning home if the driver were incapacitated or inebriated.

Those skilled in the art of embedded device development and user interface design will recognize the use of a host system to provide display and input services to an embedded system.

FIG. 2—OPERATION OF THE PREFERRED EMBODIMENT TO NAVIGATE BACK TO AN ORIGIN

Figure 2:
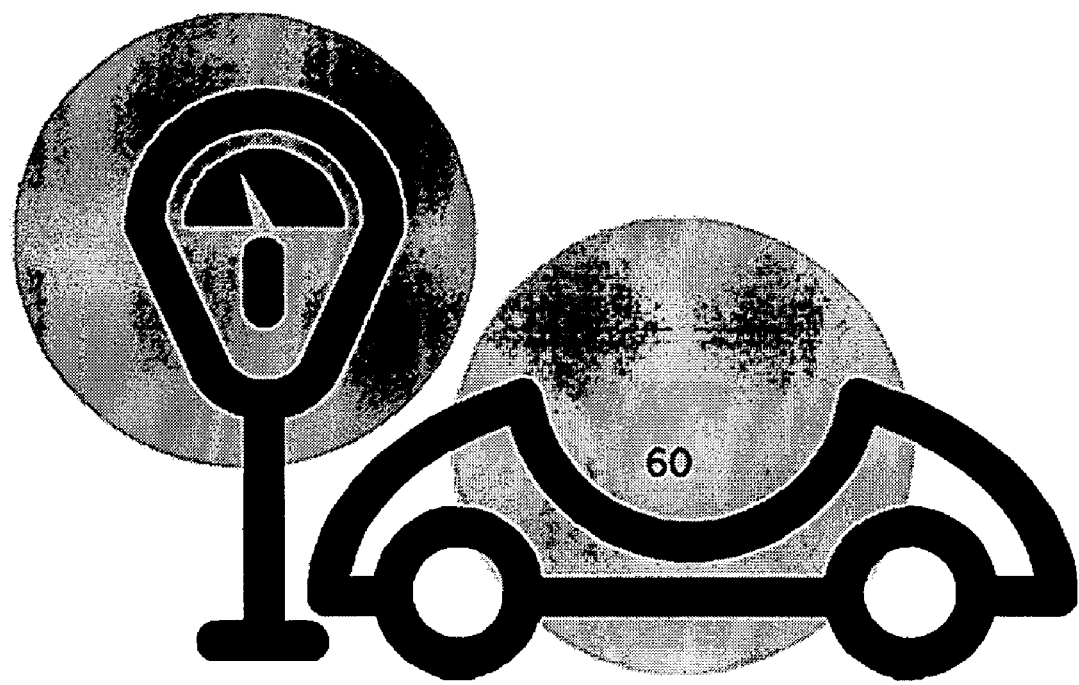
FIG. 2 shows usage of the invention to point the way back to an origin
Figure 2:
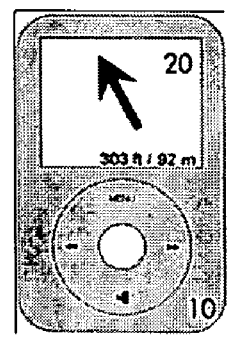

FIG. 2 shows the device 10 in use as a user returns to their car parked at a parking meter 60. In the figure, the device 10 is still 92 meters from the parked car 60. The direction of travel to the origin, displayed as a directional arrow 30 on the display 20 is indicating that the user should travel forward and a little to the left to return to the origin where the car is parked.

In order for the device to be genuinely useful, it is very important that the entire device be self-contained, meaning, that it has no external power supply and no docking cradle directly involved in the operation of the device, for example, using the action of removing the device from its cradle as a signal that it should consider the current location the origin. This would impede its usefulness under various circumstances by effectively tethering its use to a car or other specialized origin.

In the preferred embodiment, the invention continuously displays the direction and distance back to the origin. For various reasons, it may be preferable to have the display only update when some event occurs (such as when a button 50 on the device 10 is pressed or some alarm is tripped by the host device) or on demand of the operator.

FIG. 3—BLOCK DIAGRAM OF THE MAJOR COMPONENTS IN THE PREFERRED EMBODIMENT

Henceforth in this description, references to axis X, axis Y, or axis Z are references to three mutually exclusive orthogonal axes where axis Z is aligned orthogonally to the surface of the earth. (Note that it is not critical for axis Z to be aligned with the earth, but it simplifies the calculations somewhat.)

Figure 3:
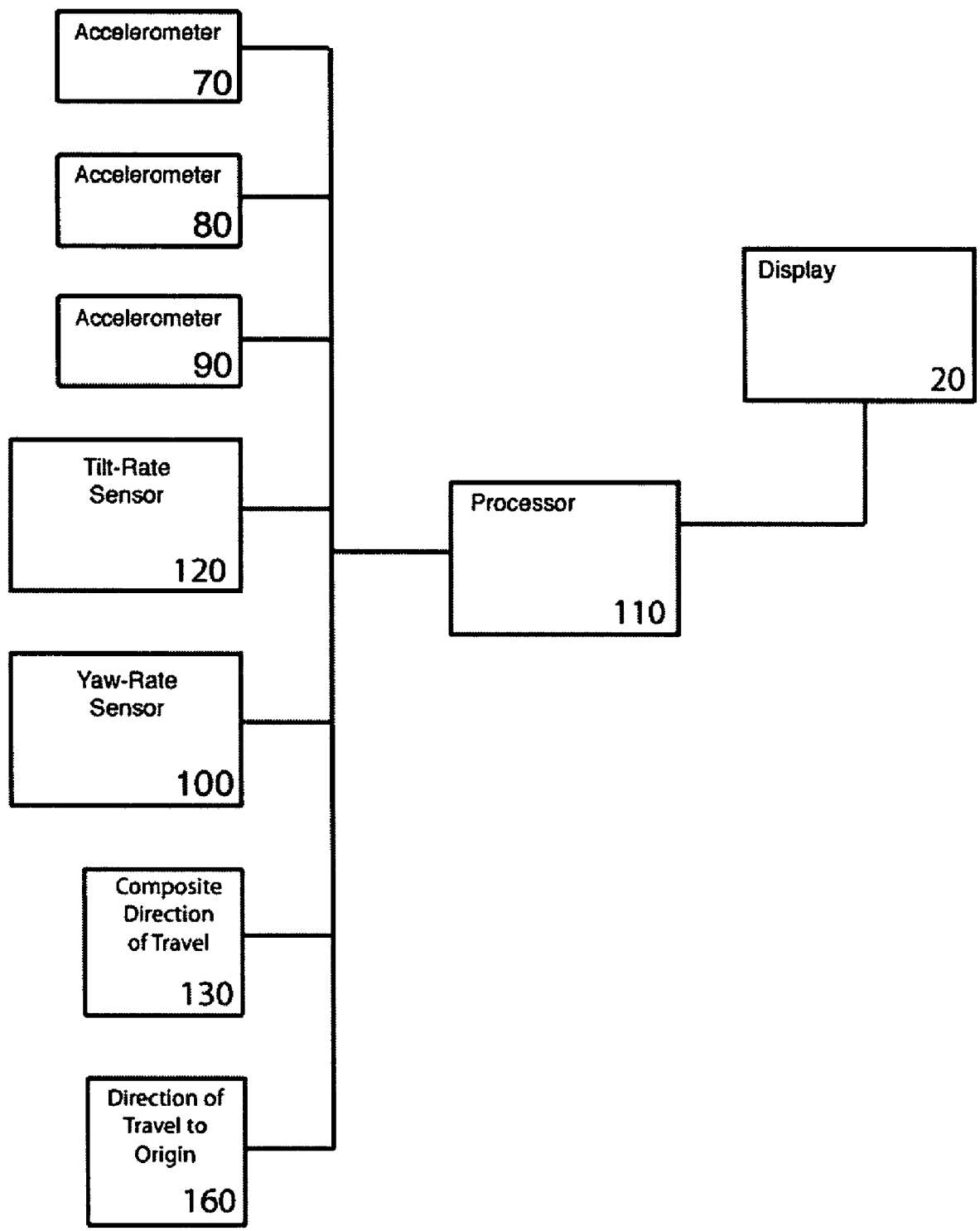
FIG. 3 is a block diagram showing the major components used in the preferred embodiment

FIG. 3 is a block diagram of the components used in the preferred embodiment to determine the location relative to the origin. The figure shows three linear accelerometers 70, 80, 90 to provide linear accelerations along axes X, Y, and Z, a tilt-rate sensor 120 to provide angular accelerations about axes X and Y, and a yaw-rate sensor 100 to provide angular accelerations about axis Z.

When the origin is identified, a composite direction of travel 130 quaternion is defined to be at the origin with no direction.

The processor 110 reads the inputs from the linear accelerometers 70, 80, 90, to determine acceleration along mutually exclusive orthogonal axes X, Y, and Z and reads from the tilt-rate sensor 120 to determine roll (rotation about axis Y) and pitch (rotation about X). Yaw (rotation about Z) is provided by the yaw-rate sensor 100.

The processor 110, expressing the rotations and linear velocities derived from the accelerations as quaternions, combines the existing composite direction of travel 130 quaternion with the new quaternions after adjusting the linear velocities to the current orientation. From the resultant quaternion comes the new composite direction of travel 130. As more accelerations and rotations are received from the linear accelerometers 70, 80, 90, the yaw-rate sensor 100 and the tilt-rate sensor 120 and at regular time intervals, a new composite direction of travel 130 quaternion is computed. As needed, the processor will transform the composite direction of travel 130 quaternion into a direction of travel to the origin 160 by rotating the composite direction of travel 130 quaternion 180 degrees about axis Z and will generate a directional arrow on the display 20 pointing back to the origin. The distance information can be calculated similarly from the composite direction of travel 130 quaternion and updated as needed on the display 20.

While the use of quaternions to combine the linear and rotational aspects described above is the preferred combination method, the problem can also be solved using 4x4 matrices or axis-angle computations.

The preferred embodiment uses a magnetoresistive sensor (for example, a compass) as a yaw-rate sensor 100. Another embodiment could use an angular accelerometer about axis Z as the yaw-rate sensor 100.

As accelerometer technology advances, it is likely that a single MEMS accelerometer chip will be able to provide data on all six degrees of freedom (6DOF: X, Y, Z, pitch, yaw, and roll) but accelerations for all six degrees of freedom will still be needed for the calculations.

Those skilled in the arts of astrophysics or the mathematics of Euclidean space will recognize the use of quaternions to combine linear and rotational movement.

FIG. 4—BLOCK DIAGRAM SHOWING ADDITIONAL EMBODIMENTS

Figure 4:
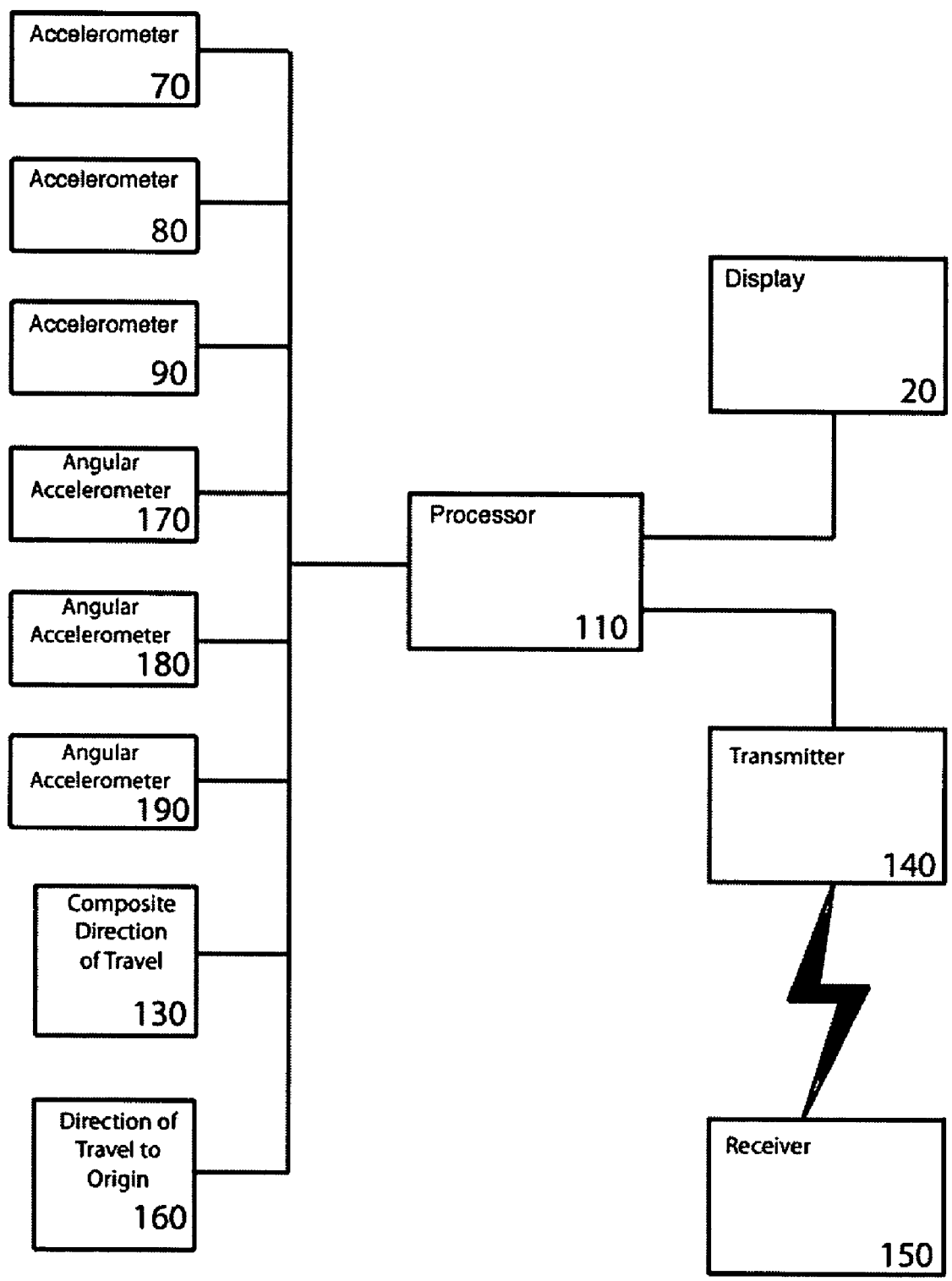
FIG. 4 is a block diagram showing aspects of additional embodiments

FIG. 4 shows a triad of linear accelerometers 70, 80, 90, the composite direction of travel 130, and the direction of travel to the origin 160 with a triad of angular accelerometers 170, 180, 190. Also added are a transmitter 140 and a receiver 150.

The tilt-rate sensor 120 (from FIG. 3) functions essentially as two angular accelerometers on two mutually exclusive orthogonal axes. They are used here to measure rotation about axis X and rotation about axis Y and report the angular acceleration in each of these directions. In FIG. 4, the tilt-rate sensor 120 has been replaced by two angular accelerometers 170, 180.

The yaw-rate sensor 100 (from FIG. 3) functions as a third angular accelerometer about axis Z. In FIG. 4, the yaw-rate sensor 100 has been replaced by a third angular accelerometer 190.

The function of the tilt-rate sensor and the yaw-rate sensor could be replaced by a three-dimensional magnetoresistive sensor to determine both tilt and yaw.

The transmitter 140 may be used to transmit the composite direction of travel to another device, a receiver 150, that could compute the direction of travel to the origin 160 and display that direction on a display of its choosing. Alternately, the processor 110 could compute the direction of travel to the origin 160 and then transmit the direction to the receiver 150. In this case, the receiver 150 simply displays the direction. The transmitter 140 could transmit only the direction of travel to the origin 160 or it could transmit any other data available to the transmitter, including linear accelerations from the accelerometers, angular accelerations, timestamps, interim calculations, et cetera.

Once the data has been transmitted to the receiver 150, the data could be stored in memory or on some non-volatile medium; the data could be retransmitted to another device or to the Internet where the data might become available to many people. The transmission medium could be one or more of any number of media. The data could be transmitted via Bluetooth (soon to be IEEE-802.14 standard), IR (infra-red) transmission, IEEE-802.11a/b/g (wireless Ethernet), a proprietary transmission protocol, or other media.

One example of the use of this embodiment would be to attach the navigation system to the tank of a SCUBA diver and then transmit the direction of travel to the origin via Bluetooth to the diver's console where an arrow could be displayed.

FIG. 5—INERTIAL REFERENCE FRAME

Figure 5:
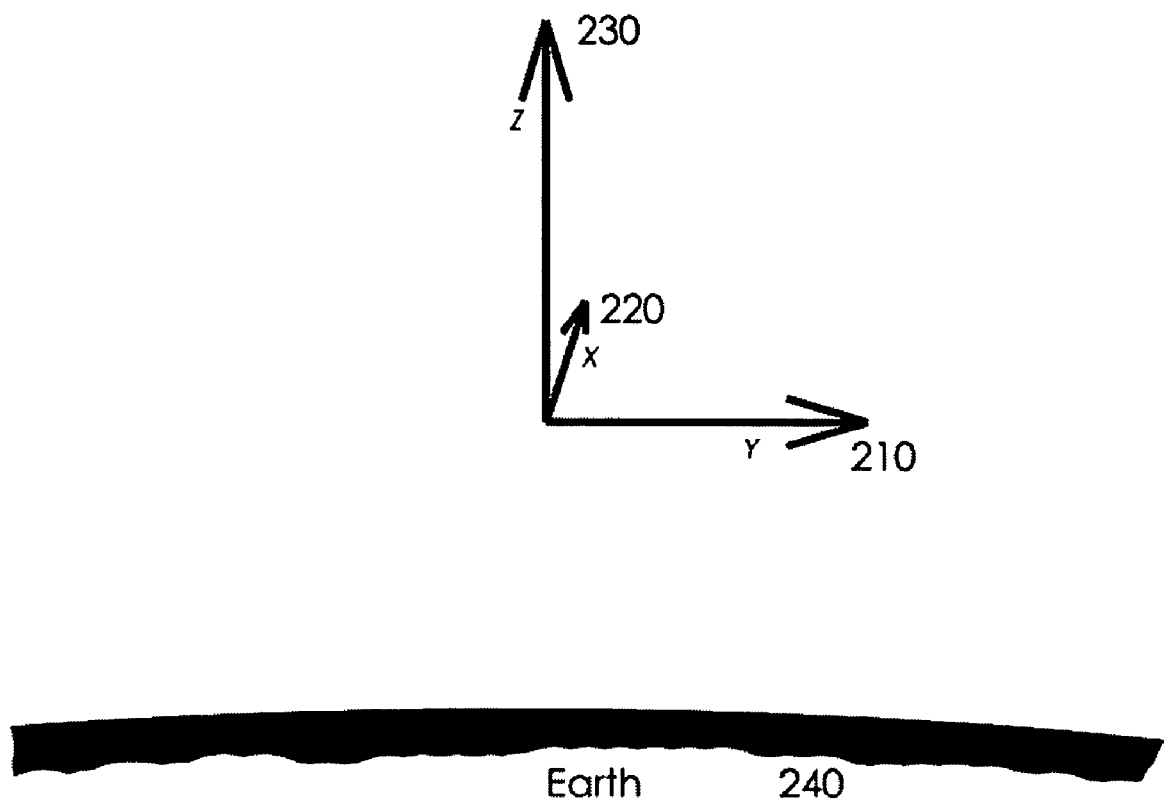
FIG. 5 is a drawing of the inertial reference frame

FIG. 5 shows an inertial reference frame containing mutually exclusive orthogonal axes X 210, Y 220, and Z 230. For clarity and for adherence to standards, axis Z is aligned orthogonally to the surface of the earth, though it is not mandatory.

Further, in some areas of study (for example, flight) the convention is for the Y-axis to be aligned orthogonally to the earth. The distinction of which axis is aligned orthogonally to the earth is not important. If axis Y 220 (or X 210) were substituted for axis Z 230, this would affect only the definitions and not the invention, for example, if Y 220 were swapped with Z 230, then it would be Y 220 that would be associated with the yaw-rate sensor 100 in FIG. 3 and Z 230 would be associated with the tilt-rate sensor 120.

FIG. 6—MOVEMENT AWAY FROM ORIGIN AND DIRECTION BACK TO ORIGIN

Figure 6:
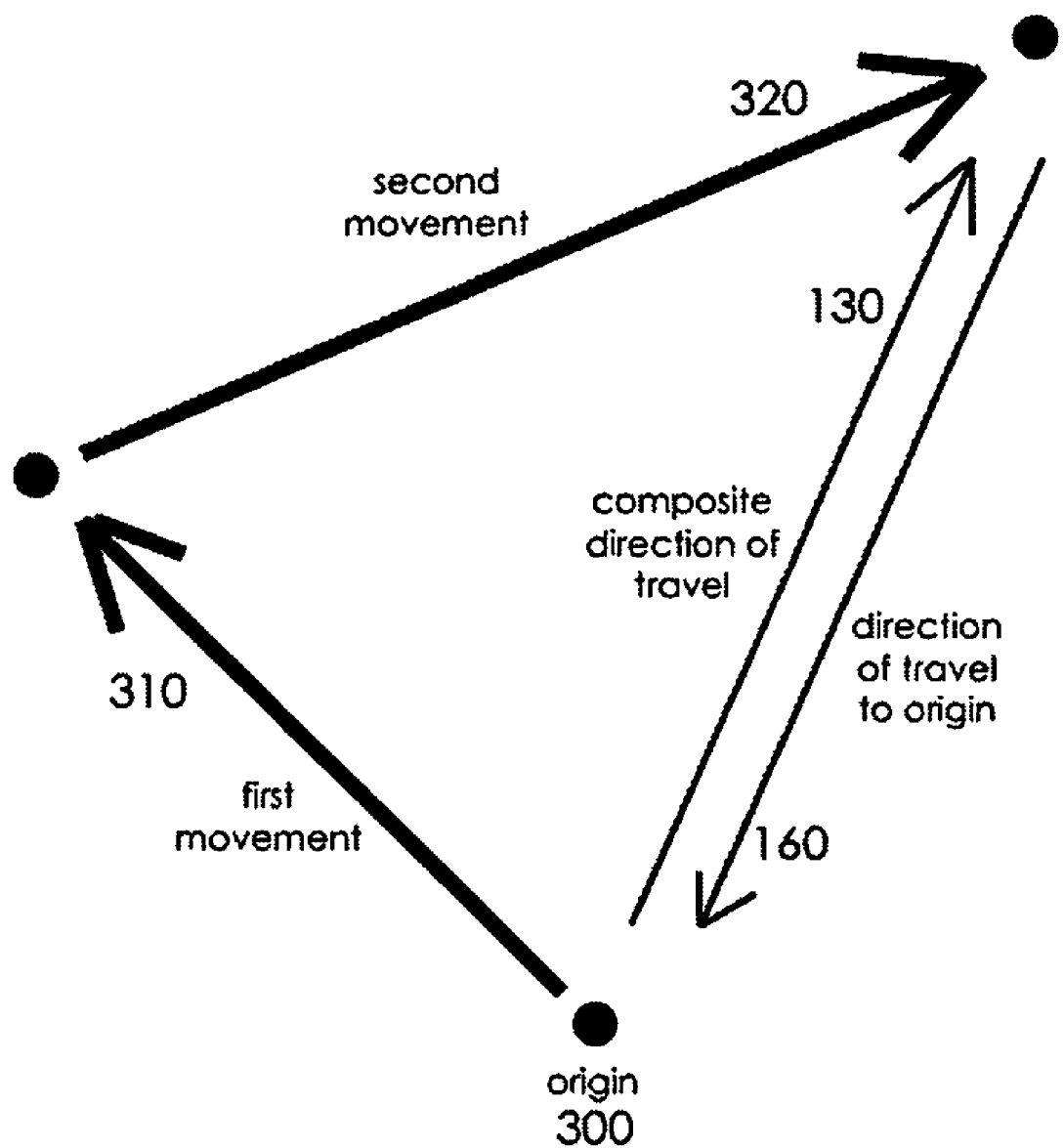
FIG. 6 illustrates movement away from the origin and the direction of travel back to the origin

In FIG. 6, an overhead view of the movement of the device, the navigation system moved in the direction indicated by the first movement 310 after the origin 300 had been identified. Then, the device moved in the direction of the second movement 320. Shown are the composite direction of travel 130 and the direction of travel to the origin 160 after the second movement 320 takes place.

Advantages

The combination of inertial (non-GPS-based) navigation with a device needing no physical connections or attachments provides value to a massive number of people who are "cartographically challenged".

With low power consumption and an extremely small footprint, this device can be embedded in nearly any consumer electronic device and will help walkers and shoppers, bikers and hikers, divers and drivers to find their way back.

CONCLUSION, RAMIFICATIONS, AND SCOPE

While the above description contains many specificities, these should not be construed as limitations on the scope of this device, but as merely providing illustrations of some of the presently preferred embodiments of it. Many other variations are possible.

For example, the device could be embedded, or packaged, with another consumer electronic device, or it could be packaged in a stand-alone housing. The device may have a variety of user interfaces or may simply record the data. It may allow the defining of user-specified (or automatic) waypoints allowing the user to follow a "course" back to the origin instead of simply heading straight back to the origin. Further, the components of the device could be distributed instead of consolidated, allowing the accelerometer or compass data to be transmitted to a remote processor which might then pass the directional information to a remote display, perhaps across the internet. Lastly, the data collected from the compass and accelerometers may be thrown away after being used or it could be saved for future downloading and analysis.

Thus, the scope of the invention should be determined by the appended claims and their legal equivalents, rather than by the examples given.

We claim:

1. A navigation system comprising:
   (a) a means for identifying an origin,
   (b) an inertial reference frame comprising mutually exclusive orthogonal axes X, Y, and Z,
   (c) a triad of linear accelerometers wherein the sensitive axis of each linear accelerometer is aligned exclusively with one axis of said inertial reference frame,
   (d) a tilt-rate sensor wherein said tilt-rate sensor senses a rotation about said axis X and a rotation about said axis Y of said inertial reference frame,
   (e) a yaw-rate sensor wherein said yaw-rate sensor senses a rotation about said axis Z of said inertial reference frame,
   (f) a processor means for computing a composite direction of travel based on a triad of linear accelerations from said triad of linear accelerometers, a tilt-rate from said tilt-rate sensor, and a yaw-rate from said yaw-rate sensor, and updating said computation at regular time intervals; and
   (g) a processor means for mathematically calculating a direction of travel to said origin from said composite direction of travel.

2. The navigation system according to claim 1, wherein said navigation system includes a display means for displaying to an operator of said navigation system said direction of travel to said origin.

3. The navigation system according to claim 2, wherein said yaw-rate sensor is a magnetoresistive sensor sensing earth's magnetic flux.

4. The navigation system according to claim 1, wherein said navigation system includes a means for transmitting said direction of travel to said origin to a receiver.

5. The navigation system according to claim 4, wherein said yaw-rate sensor is a magnetoresistive sensor sensing earth's magnetic flux.

6. The navigation system according to claim 1, wherein said yaw-rate sensor and said tilt-rate sensor are a three-dimensional magnetoresistive sensor.

7. A navigation system comprising:
   (a) an input button for identifying an origin,
   (b) an inertial reference frame comprising mutually exclusive orthogonal axes X, Y, and Z,
   (c) a triad of linear accelerometers wherein the sensitive axis of each linear accelerometer is aligned exclusively with one axis of said inertial reference frame,
   (d) a triad of angular accelerometers wherein each angular accelerometer senses a rotation about exclusively one axis of said inertial reference frame,
   (e) a processor for computing a composite direction of travel based on a triad of linear accelerations from said triad of linear accelerometers and a triad of angular accelerations from said triad of angular accelerometers, and updating said computation at regular time intervals; and
   (f) a processor for mathematically calculating a direction of travel to said origin from said composite direction of travel.

8. The navigation system according to claim 7, wherein said navigation system includes a display for displaying to an operator of said navigation system said direction of travel to said origin.

9. The navigation system according to claim 7, wherein said navigation system includes a transmitter for transmitting said direction of travel to said origin to a receiver.

10. The navigation system according to claim 7, wherein said yaw-rate sensor and said tilt-rate sensor are a three-dimensional magnetoresistive sensor.

\* \* \* \* \*